United States Patent
Tanaka et al.

(10) Patent No.: US 7,420,632 B2
(45) Date of Patent: Sep. 2, 2008

(54) COLOR FILTER AND LIQUID CRYSTAL DISPLAY DEVICE PROVIDED WITH THE SAME

(75) Inventors: Hideyo Tanaka, Tokyo (JP); Hidesato Hagiwara, Tokyo (JP); Takeshi Itoi, Tokyo (JP); Takumi Saito, Tokyo (JP); Koichi Minato, Tokyo (JP)

(73) Assignees: Toyo Ink Mfg. Co., Ltd., Tokyo (JP); Toppan Printing Co., Ltd., Tokyo (JP)

( * ) Notice: Subject to any disclaimer, the term of this patent is extended or adjusted under 35 U.S.C. 154(b) by 491 days.

(21) Appl. No.: 11/094,226

(22) Filed: Mar. 31, 2005

(65) Prior Publication Data

US 2005/0219443 A1    Oct. 6, 2005

(30) Foreign Application Priority Data

Mar. 31, 2004    (JP)    ............... 2004-104603

(51) Int. Cl.
   *G02F 1/1335*    (2006.01)
(52) U.S. Cl. .................. 349/106; 349/96; 349/107; 430/108.21; 524/88
(58) Field of Classification Search ................. 349/106, 349/107, 96; 430/108.21; 524/88
See application file for complete search history.

(56) References Cited

U.S. PATENT DOCUMENTS

| | | | | |
|---|---|---|---|---|
| 4,934,791 | A | * | 6/1990 | Shimizu et al. .............. 349/107 |
| 5,871,872 | A | * | 2/1999 | Matijevic et al. ................ 430/7 |
| 2003/0087968 | A1 | * | 5/2003 | Ishikawa et al. ............... 516/88 |
| 2004/0185362 | A1 | * | 9/2004 | Arthur et al. ........... 430/108.21 |
| 2005/0131114 | A1 | * | 6/2005 | Sunahara ..................... 524/88 |

FOREIGN PATENT DOCUMENTS

| | | | |
|---|---|---|---|
| JP | 08171014 | * | 7/1996 |
| JP | 2001-194658 | | 7/2001 |
| JP | 2002-214436 | | 7/2002 |
| JP | 2002214436 | * | 7/2002 |

\* cited by examiner

*Primary Examiner*—Julie-Huyen Ngo
(74) *Attorney, Agent, or Firm*—Nixon & Vanderhye P.C.

(57) ABSTRACT

A color filter is provided with red, green and blue color filter segments. When chromaticity coordinates (x, y) in a chromaticity diagram of XYZ color specification system are measured with the color filter being sandwiched between two polarizers, a chromaticity $(x_p, y_p)$ of parallel-transmitted light and a chromaticity $(x_c, y_c)$ of orthogonal-transmitted light satisfy the following formula (1):

$$\Delta xy = [(x_p - x_c)^2 + (y_p - y_c)^2]^{1/2} < 0.130 \qquad (1)$$

A liquid crystal display device is provided with such a color filter.

18 Claims, 4 Drawing Sheets

COLOR FILTER AND LIQUID CRYSTAL DISPLAY DEVICE PROVIDED WITH THE SAME

CROSS-REFERENCE TO RELATED APPLICATIONS

This application is based upon and claims the benefit of priority from prior Japanese Patent Application No. 2004-104603, filed Mar. 31, 2004, the entire contents of which are incorporated herein by reference.

BACKGROUND OF THE INVENTION

1. Field of the Invention

The present invention relates to a color filter for use in a color liquid crystal display device and to a liquid crystal display device provided with the color filter.

2. Description of the Related Art

A color liquid crystal display device is essentially constituted by a first transparent substrate having a first transparent electrode layer formed thereon, a second transparent substrate having a second transparent electrode layer formed thereon, and a liquid crystal layer sealed between these transparent substrates. A color filter is generally interposed between the second transparent substrate and the second transparent electrode layer. The color filter includes a black matrix as a light-shielding pattern and fine stripe filter segments of red, green and blue arranged in parallel to or intersected with each other on the surface of a transparent substrate such as glass, or fine filter segments horizontally and vertically arranged at a constant sequence.

On the outer sides of the first and second transparent substrates, there are arranged a first polarizer and a second polarizer, respectively. Further, on the outer side of the first polarizer, there is arranged a backlight unit including a backlight source.

With such a liquid crystal display device, the display of images is performed in such a manner that the voltage applied across the first and second transparent electrode layers is adjusted individually for each filter segment, and the magnitude of polarization of the light from the backlight unit passed through the first polarizer is controlled to thereby control the light amount passing through the second polarizer. Therefore, the chromatic characteristics of the color filter and of the polarizer are both important factors which determine the chromatic characteristics of liquid crystal display device.

In recent years, various advantageous aspects of the liquid crystal display device such as space-saving, weight-saving and power-saving due to its thin flatness are increasingly favorably evaluated, so that the application of liquid crystal display device is now rapidly expanded to televisions as well as to monitors of a large size. Thus, it is now increasingly desired for the color filter, which determines the chromatic characteristics of liquid crystal display devices, to have enhanced luminance, color reproduction and contrast.

However, the conventional color filters are different in chromaticities of the parallel-transmitted light passing through the color filter (the light transmitted through two polarizer sandwiching the color filter, with the axes of polarization of the polarizers being made parallel with each other) and the orthogonal-transmitted light passing through the color filter (the transmitted light slightly leaking through two polarizer sandwiching the color filter, with the axes of polarization of the polarizers being orthogonally intersected with each other). Therefore, the chromatic characteristics at the white image-displaying time in the liquid crystal display device become different from the chromatic characteristics at the black image-displaying time, often resulting in display of somewhat tinted images at the black image-displaying time, thus deteriorating the visibility of images. As a result, it has been difficult to obtain a television or monitor of a large size having satisfactory display qualities.

In order to solve these problems, it has been proposed for a ratio between a maximum contrast ratio ($CR_1$) of color pattern and a minimum contrast ratio ($CR_2$) of color pattern among the color patterns of each color to satisfy the relationship of: $CR_1/CR_2 \leq 1.6$ (see Jpn. Pat. Appln. KOKAI Publication No. 2001-194658). This proposal is intended to restrict the contrast ratio of each of color filter segments to a predetermined range, thereby making the quantity of light leakage amount uniform at the black image-displaying time, thus minimizing the tinting of black images.

Further, the chromatic characteristics of the polarizer itself which influences the chromatic characteristics of liquid crystal display devices also differ where the axes of polarization are made parallel with each other or where the axes of polarization are orthogonally intersected with each other. Where the axes of polarization are orthogonally intersected with each other, images visible on the display would be much more tinted with blue color as compared with where the axes of polarization are made parallel with each other. Therefore, it has been proposed to adjust not only the chromaticity of parallel-transmitted light but also the chromaticity of orthogonal-transmitted light to a predetermined range (see Jpn. Pat. Appln. KOKAI Publication No. 2002-214436).

Many of the conventional liquid crystal display devices display bluish images at the black image-displaying time due to the influence by the polarizers. Therefore, even if the contrast ratio of each color filter segments of the color filter is made uniform, it is impossible to prevent visible images from becoming considerably bluish at the black image-displaying time, thus still failing to completely solve the problem that a difference in chromatic characteristics is caused to occur at the white image-displaying time and at the black image-displaying time.

BRIEF SUMMARY OF THE INVENTION

Therefore, an object of the present invention is to provide a color filter which is not different in chromatic characteristics at the white image-displaying time and at the black image-displaying time of a liquid crystal display device and which is excellent in visibility, as well as to provide a liquid crystal display device provided with such a color filter.

According to one aspect of the present invention, there is provided a color filter comprising red, green and blue color filter segments, wherein when chromaticity coordinates (x, y) in the chromaticity diagram of the XYZ color specification system are measured with the color filter being sandwiched between two polarizers, the chromaticity ($x_p$, $y_p$) of parallel-transmitted light and the chromaticity ($x_c$, $y_c$) of the orthogonal-transmitted light satisfy the following formula (1):

$$\Delta xy=[(x_p-x_c)^2+(y_p-y_c)^2]^{1/2}<0.130 \qquad (1)$$

According to another aspect of the present invention, there is provided a liquid crystal display device provided with a color filter of the present invention.

In the color filter of the present invention, it is preferred that the chromaticity ($x_c$, $y_c$) of the orthogonal-transmitted light is within a region on the xy plane of the chromaticity diagram of the XYZ color specification system, defined by a first straight-line connecting a chromaticity a (0.180, 0.180) with a chromaticity b (0.270, 0.180), a second straight line connecting the chromaticity b with a chromaticity c (0.320, 0.250), a third straight line connecting the chromaticity c with a chromaticity d (0.380, 0.280), a fourth straight line connecting the chromaticity d with a chromaticity e (0.400, 0.430), a fifth straight line connecting the chromaticity e with a chromaticity f (0.300, 0.350), and a sixth straight line connecting the chromaticity f and the chromaticity a.

Further, the contrast ratio of a color filter according to the present invention is preferably 1400 or more, and the contrast ratio of red, green and blue color filter segments preferably satisfy the following formulas (2), (3) and (4).

$$CB/CG \geq 1.30 \quad (2)$$

$$1.80 \geq CR/CG \geq 0.50 \quad (3)$$

$$CB/CR \geq 1.30 \quad (4)$$

where CR is a contrast ratio of the red filter segment; CG is a contrast ratio of the green filter segment; and CB is a contrast ratio of the blue filter segment.

Further, in a color filter according to the present invention, the chromaticity coordinate, y, of the blue color filter segments in the chromaticity diagram of the XYZ color specification system is preferably less than 0.140 and the contrast ratio thereof is preferably not less than 2000. Further, the blue color filter segment is preferably formed from a blue colored composition comprising a dyestuff carrier consisting of a transparent resin, a precursor thereof or a mixture thereof; C.I. Pigment Blue 15:6 pigment having a specific surface area of not less than 90 m$^2$/g as measured according to BET method; and, optionally, C.I. Pigment Violet 23 pigment having a specific surface area of not less than 90 m$^2$/g as measured according to BET method.

DETAILED DESCRIPTION OF THE INVENTION

First, a color filter according to the present invention will be explained.

The color filter of the present invention comprises red, green and blue color filter segments. With the color filter of the invention, when chromaticity coordinates (x, y) in the chromaticity diagram of the XYZ color specification system are measured with the color filter being sandwiched between two polarizers, the chromaticity $(x_p, y_p)$ of parallel-transmitted light and the chromaticity $(x_c, y_c)$ of orthogonal-transmitted light satisfy the following formula (1):

$$\Delta xy = [(x_p - x_c)^2 + (y_p - y_c)^2]^{1/2} < 0.130 \quad (1)$$

A liquid crystal display device fabricated using a color filter having $\Delta xy$ within the range defined by the formula (1) is little different in chromatic characteristics at the white image-displaying time and at the black image-displaying time and hence excellent in visibility of images. Preferably, the value of $\Delta xy$ is less than 0.110, more preferably less than 0.090.

Figure 1:
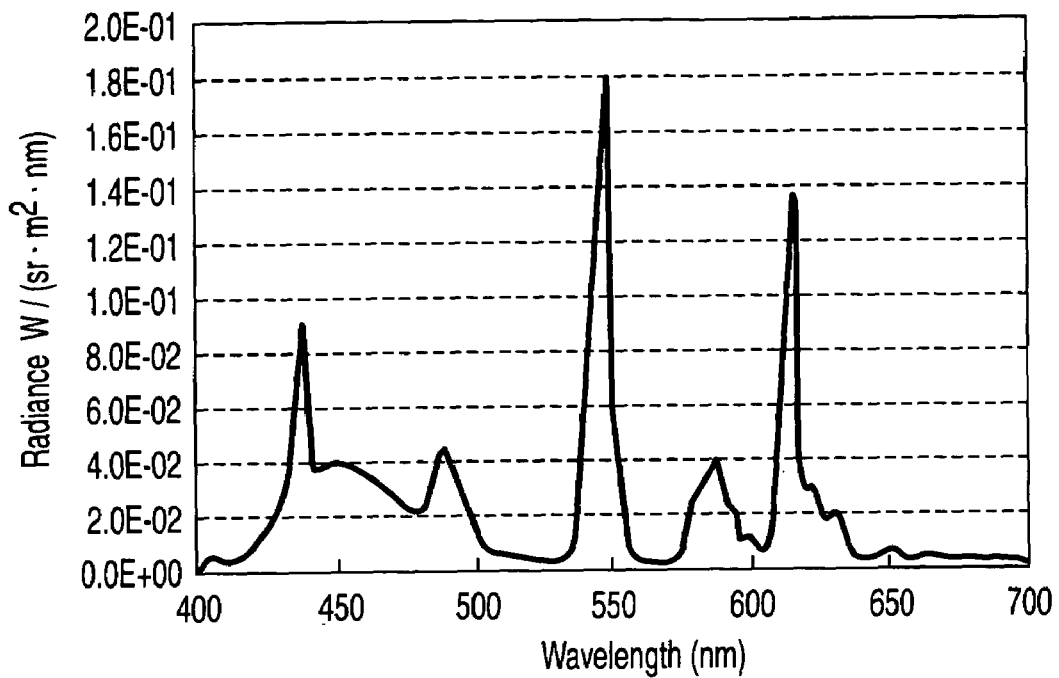
FIG. 1 is a graph showing an emission spectrum of a backlight.

The chromaticity $(x_p, y_p)$ of parallel-transmitted light and the chromaticity $(x_c, y_c)$ of orthogonal-transmitted light in the chromaticity diagram of the XYZ color specification system with a color filter being sandwiched between two polarizers are measured using a luminance calorimeter and with a 2 degree field of view (CIE 1931 color specification system). As the light source, use is made of the one which exhibits an emission spectrum as shown in FIG. 1, a luminance of 1937 cd/m$^2$, chromaticity coordinates (x, y) of (0.316, 0.301) in the chromaticity diagram of the XYZ color specification system, a color temperature of 6525 K, and a chromaticity deviation, duv, of −0.0136. Further, as the polarizers, NPF-SEG 1224 DU (Nitto Denko Co., Ltd.) is used.

Figure 2:
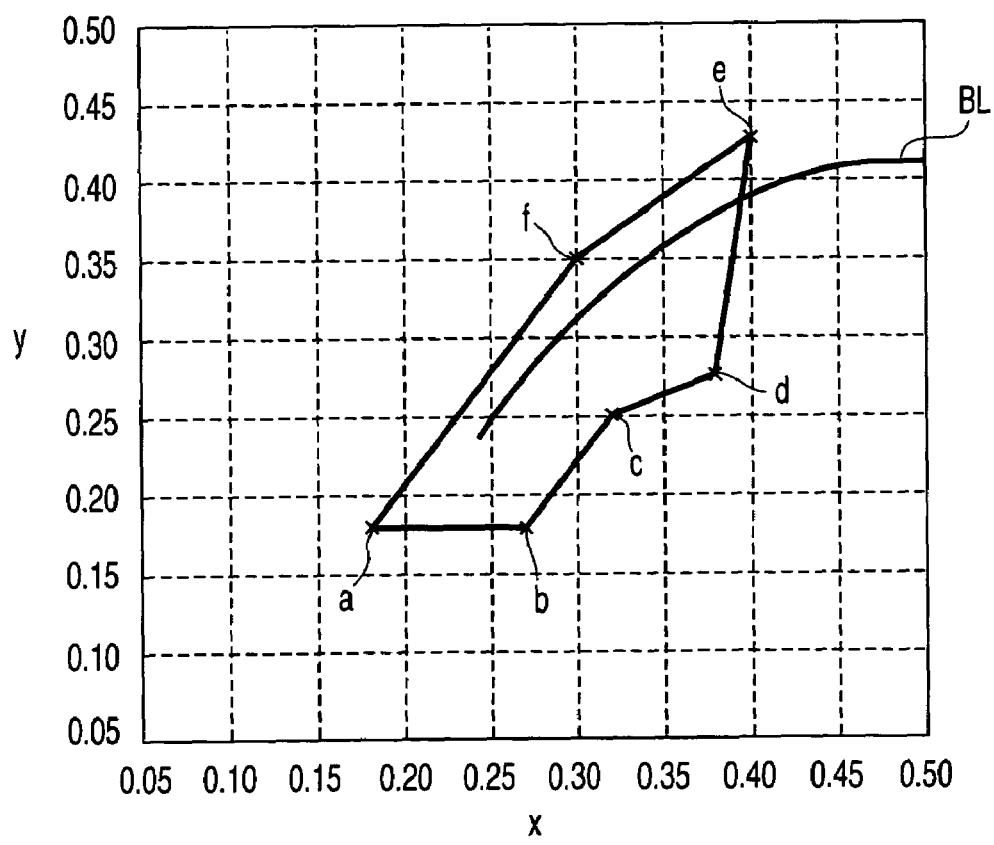
FIG. 2 is a graph showing an area of chromaticity which is bounded by six chromaticity points which are defined in one embodiment of the present invention.

In order to minimize any difference in chromatic characteristics at the white image-displaying time and at the black image-displaying time of a liquid crystal display device and to suppress the tinting of images at the black image-displaying time, it is desirable that the chromaticity $(x_c, y_c)$ of orthogonal-transmitted light is within a region (see FIG. 2) on the xy plane of the chromaticity diagram of the XYZ color specification system, defined by a first straight line connecting a chromaticity a (0.180, 0.180) with a chromaticity b (0.270, 0.180), a second straight line connecting the chromaticity b with a chromaticity c (0.320, 0.250), a third straight line connecting the chromaticity c with a chromaticity d (0.380, 0.280), a fourth straight line connecting the chromaticity d with a chromaticity e (0.400, 0.430), a fifth straight line connecting the chromaticity e with a chromaticity f (0.300, 0.350), and a sixth straight line connecting the chromaticity f and the chromaticity a. If the chromaticity $(x_c, y_c)$ of orthogonal-transmitted light of the color filter falls outside this region, the correlated color temperature may be considerably decreased or otherwise considerably deviated relative to the blackbody locus (shown by a line BL in FIG. 2), thus giving more or less feeling of tinting of images. It is more preferable that the chromaticity $(x_c, y_c)$ of orthogonal-transmitted light of the color filter is within a region defined by a straight line connecting a chromaticity a' (0.220, 0.220) with a chromaticity b' (0.280, 0.210), a straight line connecting the chromaticity b' with a chromaticity c' (0.300, 0.250), a straight line connecting the chromaticity c' with a chromaticity d' (0.350, 0.290), a straight line connecting the chromaticity d' with a chromaticity e' (0.360, 0.380), a straight line connecting the chromaticity e' with a chromaticity f' (0.290, 0.320), and a straight line connecting the chromaticity f' with the chromaticity a'. It is most preferable that the chromaticity $(x_c, y_c)$ of orthogonal-transmitted light of color filter are within a region defined by a straight line connecting a chromaticity a" (0.240, 0.230) with a chromaticity b" (0.280, 0.220), a straight line connecting the chromaticity b" with a chromaticity c" (0.300, 0.260), a straight line connecting the chromaticity c" with a chromaticity d" (0.340, 0.300), a straight line connecting the chromaticity d" with a chromaticity e" (0.340, 0.350), a straight line connecting the chromaticity e" with a chromaticity f" (0.290, 0.300), and a straight line connecting the chromaticity f" with the chromaticity a".

The contrast ratio of the color filter according to the present invention is preferably less than 1400, more preferably not less than 1800, most preferably not less than 2000. If the contrast ratio of the color filter is less than 1400, the light that has been scattered at the color filter leaks, when the resultant color filter is mounted on a liquid crystal display device, thus giving weakly modulated image display, i.e., insufficient image quality.

The upper limit of the contrast ratio of the color filter can be enhanced up to the contrast ratio of the polarizer (i.e., contrast ratio of the polarizer alone without the color filter), and the contrast of the polarizer is about 15000 at present.

In order to suppress any difference in chromatic characteristics at the white image-displaying time and at the black image-displaying time of a liquid crystal display device, the contrast ratio of red, green and blue color filter segments preferably satisfy the following formulas (2), (3) and (4).

$$CB/CG \geq 1.30 \quad (2)$$

$$1.80 \geq CR/CG \geq 0.50 \quad (3)$$

$$CB/CR \geq 1.30 \quad (4)$$

where CR is a contrast ratio of the red filter segment; CG is a contrast ratio of the green filter segment; and CB is a contrast ratio of the blue filter segment.

It is preferable that the values of CB/CG and CB/CR both mainly related to $\Delta xy$ are as high as possible. Further, the value of CR/CG mainly related to a deviation between the chromaticity of the orthogonal-transmitted light of color filter and the blackbody locus is preferably as close to 1.00 as possible. The values of CB/CG, CR/CG and CB/CR is more preferably CB/CG$\geq$1.50, 1.60$\geq$CR/CG$\geq$0.60, and CB/CR$\geq$1.50; most preferably to CB/CG$\geq$1.70, 1.40$\geq$CR/CG$\geq$0.70, and CB/CR$\geq$1.70.

When an actually feasible contrast ratio of the blue color filter segment is taken into account, the upper limit of both of CB/CG and CB/CR is about 10.00.

The blue color filter segment in the color filter of the present invention preferably has the chromaticity coordinate, y, in the chromaticity diagram of the XYZ color specification system of less than 0.140 and the contrast ratio thereof is preferably not less than 2000. The chromaticity coordinate, y, in the chromaticity diagram of the XYZ color specification system is measured using C-light source. More preferably, the contrast ratio of the blue color filter segment is not less than 3000, most preferably not less than 4000. If the contrast ratio is less than 2000, it will become difficult to actually realize the relationships defined by the formulas (2) and (4) above and to decrease the value of $\Delta xy$. The upper limit of the contrast ratio of the color filter can be enhanced up to the contrast ratio of the polarizer (i.e., contrast ratio of the polarizer alone without the color filter), and the contrast of the polarizer is about 15000 at present.

Each of the color filter segments of the color filter of the present invention can be prepared using a colored composition comprising a dyestuff carrier consisting of a transparent resin, a precursor thereof or a mixture thereof; a dyestuff; and, if required, an organic solvent.

As the dyestuff included in the colored composition, it is possible to employ organic or inorganic pigments singly or in combination of two or more. Among these pigments, those which are high in color-developing property, high in heat resistance, and especially high in resistance to thermal decomposition. Usually, organic pigments are used.

Examples of the organic pigments usable in the colored compositions are shown below with a color index number.

For the blue colored composition for forming the blue color filter segments, blue pigments such as C.I. Pigment Blue 15, 15:1, 15:2, 15:3, 15:4, 15:6, 16, 22, 60, 64 and 80, more preferably C.I. Pigment Blue 15:6 may be used.

Further, in the blue colored composition, a violet pigment such as C.I. Pigment Violet 1, 19, 23, 27, 29, 30, 32, 37, 40, 42 and 50, more preferably C.I. Pigment Violet 23 may be additionally used.

For the red colored composition for forming the red filter segments, red pigments, for example, C. I. Pigment Red 7, 14, 41, 48:1, 48:2, 48:3, 38:4, 81:1, 81:2, 81:3, 81:4, 146, 168, 177, 178, 184, 185, 187, 200, 202, 208, 210, 246, 254, 255, 264, 270, 272 and 279 can be used. In the red colored composition, a yellow and/or orange pigment can be additionally used.

The yellow pigment includes C. I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 198, 199, 213 and 214.

The orange color pigment includes C.I. Pigment Orange 36, 43, 51, 55, 59, 61, 71 and 73.

For the green colored composition for forming the green color filter segments, a green pigment such as C.I. Pigment Green 7, 10, 36 and 37 may be used. The green colored composition may additionally contain the yellow pigments used in the red colored composition.

As the inorganic pigments, use may be made of metal oxide powder, metal sulfide powder or metal powder, such as chrome yellow, zinc yellow, red ion oxide (III), cadmium red, ultramarine, Prussian blue, chromium oxide green, and cobalt green. The inorganic pigments may be employed in combination with organic pigments in order to secure excellent coatability, sensitivity and developing property without deteriorating a balance between color saturation and brilliancy.

For the purpose of toning, the colored composition may further contain dye so long as it does not badly affect the heat resistance of the colored composition.

In order to realize enhanced luminance and enhanced contrast ratio of the color filter, the pigments incorporated into the colored composition is preferably finely divided, and preferably have a large specific surface area.

In particular, the specific surface area of the blue pigments in the blue colored composition is preferably not less than 90 $m^2/g$, more preferably not less than 100 $m^2/g$, most preferably not less than 110 $m^2/g$, as measured according to BET method. Further, the specific surface area of blue pigments is preferably not more than 140 $m^2/g$ as measured according to BET method.

Further, the specific surface area of the violet pigments is preferably not less than 90 $m^2/g$, more preferably not less than 100 $m^2/g$, most preferably not less than 110 $m^2/g$, as measured according to BET method. However, the specific surface area of violet pigments is preferably not more than 150 $m^2/g$, as measured according to BET method.

If the specific surface area of each of these pigments is less than the aforementioned lower limit, the luminance as well as the contrast ratio of the color filter tends to be deteriorated. On the other hand, if the specific surface area of each of these pigments is larger than the aforementioned upper limit, it will become difficult to sufficiently disperse the pigments, thus making it difficult to retain the stability of the colored composition and to secure a sufficient fluidity of the colored composition. As a result, the luminance and contrast ratio of the color filter will be deteriorated.

As means for controlling a specific surface area of a pigment, there are a method in which a pigment is mechanically grinded to control a specific surface area (called grinding method), a method in which a pigment dissolved in a good solvent is added to a poor solvent to precipitate a pigment having a desired specific surface area (called precipitation method), and a method in which a pigment having a desired specific surface area is obtained upon its synthesis (called synthesis precipitation method). A specific surface area can be controlled by selecting an appropriate method for individual pigments depending on a method of synthesizing a pigment used, chemical properties of the pigment, and the like.

The methods of controlling a specific surface area will be explained in more detail below, and any of these methods may be used as a method of controlling a specific surface area of pigments contained in the colored composition of the present invention.

The grinding method is a method in which a pigment is mechanically kneaded together with a grinding agent such as a water-soluble inorganic salt such as sodium chloride as well as a water-soluble organic solvent which does not dissolve the grinding agent by using a ball mill, a sand mill or a kneader (hereinafter, this step is referred to as salt milling). The inorganic salt and the organic solvent are removed by washing with water, and the pigment thus prepared is dried to obtain a pigment having a desired specific surface area. However, crystals of a pigment is grown by the salt milling treatment in some cases. Therefore, it is effective to prevent the crystal growth by adding a solid resin or a pigment dispersant, which is at least partially dissolved in the organic solvent, at the time of the salt milling treatment.

With regard to a ratio of the pigment and the inorganic salt, when a proportion of the inorganic salt becomes larger, effect of finely-dividing the pigment becomes better, but since an amount of the pigment treated becomes small, productivity is reduced. Generally, it is suitable to use the organic salt in an amount of 1 to 30 parts by weight, preferably 2 to 20 parts by weight per 1 part by weight of the pigment. The water-soluble organic solvent is added in order to make a pigment and an inorganic salt a uniform mass, and the solvent is usually used in an amount of 50 to 300% by weight of the weight of the pigment depending on the ratio of the pigment and the inorganic salt.

The salt milling will be explained further specifically. A small amount of a water-soluble organic solvent as a wetting agent is added to a mixture of a pigment and a water-soluble inorganic salt. The resultant mixture is vigorously kneaded with, e.g., a kneader. The kneaded mixture is placed into water, and stirred with, e.g., a high speed mixer to obtain a slurry. Then, this slurry is filtered, washed with water and dried, affording a pigment having a desired specific surface area.

The precipitation method is a method in which a pigment is dissolved in an appropriate good solvent, and the resultant solution is mixed a poor solvent to precipitate a pigment having a desired specific surface area. The magnitude of the specific surface area can be controlled by, e.g., a kind and an amount of the solvent, a precipitation temperature, and a precipitation rate. Generally, a pigment is difficult to dissolve in a solvent and a usable solvent is limited. However, for example, a strong acidic solvent such as a concentrated sulfuric acid, polyphosphoric acid or chlorosulfonic acid, or a basic solvent such as liquid ammonia or a solution of sodium methylate in dimethylformamide is known as a good solvent for the pigment.

A representative example of the precipitation method is an acid pasting method, in which a solution of a pigment in an acidic solvent is poured into other solvent to re-precipitate the pigment to obtain fine particles of the pigment. Industrially, from a viewpoint of a cost, a method in which a solution of a pigment in sulfuric acid is poured into water is generally employed. A concentration of sulfuric acid is not particularly limited, but 95 to 100% by weight is preferable. An amount of sulfuric acid used relative to a pigment is not particularly limited. However, when the amount is small, a viscosity of the pigment solution is increased, and handling becomes difficult. Conversely, when the amount is too large, efficiency of treating a pigment is reduced. Thus, it is preferable to use sulfuric acid in an amount 3 to 10-fold the weight of the pigment. Note that it is not necessary that the pigment is completely dissolved. A temperature at dissolution is preferably 0 to 50° C. When the temperature is lower than 0° C., sulfuric acid may be frozen, and solubility of the pigment is reduced. When the temperature is too high, a side reaction easily occurs. A temperature of water into which a solution of a pigment in sulfuric acid is poured is preferably 1 to 60° C. When pouring is initiated at a temperature higher than 60° C., water may boil by heat of dissolution sulfuric acid, and working becomes dangerous. When the temperature is lower than 1° C., the pigment solution may be frozen. A time for pouring is preferably 0.1 to 30 minutes per 1 part of a pigment. There is a tendency that as a time becomes longer, the specific surface area becomes smaller.

The control of the specific surface area of the pigments contained in the blue colored composition of the present invention can be effected, while a degree of particle size adjustment of the pigment is taken into consideration, by a combination of the precipitation method such as an acid pasting method with the grinding method such as a salt milling method. In this case, conveniently, flowability as a pigment dispersion can be also secured.

During the salt milling or acid pasting, in order to prevent aggregation of the pigment accompanied with control of the specific surface area, a dispersing aid such as a derivative described below, a resin-type pigment dispersant, or a surfactant may be additionally used. By performing specific surface area control in the presence of two or more kinds of pigments, even a pigment, which is difficult to be dispersed singly, can be prepared as a stable dispersion.

As a special precipitation method, there is a leuco method. When a vat pigment such as a flavanthrone, perynone, perylene or indanthrone pigment is reduced with alkaline hydrosulfite, the quinone group becomes a sodium salt of hydroquinone (leuco compound), and the pigment becomes water-soluble. By adding an appropriate oxidizing agent to this aqueous solution to oxidize the pigment, a pigment which is insoluble in water and has a great specific surface area can be precipitated.

The synthesis precipitation method is a method in which a pigment having a desired specific surface area is precipitated upon its synthesis. However, when the produced fine pigment is taken out from a solvent, filtration which is a general separating method becomes difficult unless pigment particles are aggregated to form great secondary particles. Therefore, this synthesis precipitation method is usually applied to an azo pigment which is synthesized in an aqueous system where secondary aggregation easily occurs.

Further, a specific surface area of a pigment may be controlled by dispersing a pigment with, e.g., a high speed sand mill for a long time (so-called dry milling method in which a pigment is dry-grinded in the absence of a grinding aid and an organic liquid), thereby increasing a specific surface area of a pigment, and at the same time, dispersing the pigment.

The dyestuff carrier is constituted by a transparent resin, its precursor or a mixture thereof. The transparent resin exhibits a light transmittance of preferably 80% or more, more preferably 95% or more with respect to the whole visible wavelengths of 400 to 700 nm. The transparent resin includes a thermoplastic resin, a thermosetting resin and an active energy beam curable resin. Its precursor includes a monomer and an oligomer which produce the transparent resin upon curing by irradiation of active energy beam, and these can be used singly or in combination. The dyestuff carrier is used in an amount of, preferably 100 to 700%, more preferably 100 to 400%, based on the weight of the pigment.

Examples of the thermoplastic resin constituting the dyestuff carrier include a butyral resin, a styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a polyester resin, an acrylic resin, an alkyd resin, a styrene resin, a polyamide resin, a rubber resin, a cyclized rubber resin, a cellulose, a polyethylene (including HDPE and LDPE), a polybutadiene, and a polyimide resin. Examples of the thermosetting resin include an epoxy resin, a benzoguanamine resin, a rosin modified maleic acid resin, a rosin modified fumaric acid resin, a melamine resin, a urea resin, and a phenolic resin.

Examples of the photosensitive resin include resins prepared by reacting a linear polymer having a reactive substituent such as hydroxyl, carboxyl or amino group with a (meth) acrylic compound having a reactive group such as isocyanato, aldehydo or epoxy group, or with cinnamic acid, thereby introducing the resultant (meth)acryloyl or styryl group into the linear polymer. Also, use may be made of a linear polymer having an acid anhydride, such as a styrene-maleic anhydride copolymer or a α-olefin-maleic anhydride copolymer which have been half esterified with a (meth)acrylic compound having a hydroxyl group, such as a hydroxyalkyl(meth)acrylate.

Examples of the monomer and oligomer constituting the dyestuff carrier include various acrylate esters and methacrylate esters such as methyl(meth)acrylate, ethyl(meth)acrylate, 2-hydroxyethyl(meth)acrylate, 2-hydroxypropyl(meth)acrylate, cyclohexyl(meth)acrylate, β-carboxyethyl(meth)acrylate, polyethylene glycol di(meth)acrylate, 1,6-hexanediol di(meth)acrylate, triethylene glycol di(meth)acrylate, tripropylene glycol di(meth)acrylate, trimethylolpropane tri(meth)acrylate, pentaerythrytol tri(meth)acrylate, 1,6-hexanediol diglycidyl ether di(meth)acrylate, bisphenol A diglycidyl ether di(meth)acrylate, neopentyl glycol diglycidyl ether di(meth)acrylate, dipentaerythrytol hexa(meth)acrylate, tricyclodecanyl(meth) acrylate, ester(meth)acrylate, (meth)acrylate of methylolated melamine, epoxy(meth)acrylate, and urethane acrylate; (meth)acrylic acid, styrene, vinyl acetate, hydroxyethyl vinyl ether, ethylene glycol divinyl ether, pentaerythrytol trivinyl ether, (meth)acrylamide, N-hydroxymethyl(meth)acrylamide, N-vinyl formamide, and acrylonitrile. These can be used singly or in combination.

The colored composition is added with a photopolymerization initiator when the composition is cured by irradiation of ultraviolet ray.

Examples of the photopolymerization initiator include acetophenone photopolymerization initiators such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexyl phenyl ketone, 2-benzyl-2-dimethylamino-1-(4-morphorinophenyl)-butan-1-one and 2-methyl-1-[4-(methylthio)phenyl]-2-morpholinopropan-1-one; benzoin photopolymerization initiators such as benzoin, benzoin methyl ether, benzoin ethyl ether, benzoin isopropyl ether and benzyl dimethyl ketal; benzophenone photopolymerization initiators such as benzophenone, benzoylbenzoic acid, methyl benzoylbenzate, 4-phenylbenzophenone, hydroxybenzophenone, acrylated benzophenone and 4-benzoyl-4'-methyldiphenyl sulfide; thioxanthone photopolymerization initiators such as thioxanthone, 2-chlorothioxanthone, 2-methylthioxanthone, isopropylthioxanthone and 2,4-diisopylthioxanthone; triazine photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis (trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis (trichloromethyl)-s-triazine, 2,4-trichloromethyl(piperonyl)-6-triazine and 2,4-trichloromethyl(4'-methoxystyryl)-6-triazine; borate photopolymerization initiators, carbazole photopolymerization initiators, and imidazole photopolymerization initiators. These photopolymerization initiators can be used singly or in combination. The photopolymerization initiator can be used in an amount of 5 to 200%, more preferably 10 to 150%, based on the weight of the dyestuff.

Further, as an sensitizer, compounds such as α-acyloxy ester, acylphosphine oxide, methylphenyl glyoxylate, benzyl, 9,10-phenanthlene quinine, camphor quinone, ethylanthraquinone, 4,4'-diethylisophthalophenone, 3,3',4,4'-tetra(t-butylperoxycarbonyl)benzophenone and 4,4'-diethylaminobenzophenone can be additionally used.

The sensitizer may be used in an amount of, preferably, 0.5 to 60% by weight, more preferably 3 to 40% by weight based on the total amount of the photopolymerization initiator and the sensitizer.

Further, the colored composition may include polyfunctional thiol which acts as a chain transfer agent.

The polyfunctional thiol may be any compound having at least two thiol groups. Examples include hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionic acid tris(2-hydroxyethyl)isocyanurate, 1,4-dimethylmericaptobenzene, 2,4,6-trimercapto-s-triazine, and 2-(N,N-dibutylamino)-4,6-dimercapto-s-triazine. These polyfunctional thiols can be employed singly or in combination.

It is preferred that the polyfunctional thiol is used in an amount of 0.1 to 200%, more preferably 0.25 to 75%, based on the weight of the dyestuff. If the amount of polyfunctional thiol is less than 0.1% by weight, it will be difficult to expect sufficient effects to be obtained through the addition thereof. On the other hand, if the amount of polyfunctional thiol exceeds 200% by weight, the sensitivity will become excessively high, resulting in the deterioration of resolution.

The colored composition of the present invention can contain a solvent as desired. Examples of the solvent include cyclohexanone, ethylcellosolve acetate, butylcellosolve acetate, 1-methoxy-2-propyl acetate, diethylene glycol dimethyl ether, ethylbenzene, ethylene glycol diethyl ether, xylene, ethylcellosolve, methyl n-amyl ketone, propylene glycol monomethyl ether, toluene, methyl ethyl ketone, ethyl acetate, methanol, ethanol, isopropanol, butanol, isobutyl ketone, and a petroleum solvent. These can be used singly or in combination. The solvent can be used in an amount of, preferable 800% to 4000%, more preferably 1000 to 2500%, based on the weight of the pigment.

The colored composition can be prepared by finely dispersing the dyestuff or dye stuff mixture of 2 or more of dyestuffs, together with the photopolymerization initiator as required, in the dyestuff carrier and the organic solvent by various dispersing means such a three-roll mill, a two-roll mill, a sand mill, a kneader or an attritor. Also, the colored composition containing tow or more dyestuffs can be prepared dispersing each of the dyestuffs separately in respective dyestuff carrier to prepare dispersions, which are then mixed together. When the dyestuff is dispersed in the dyestuff carrier, a dispersing aid such as a resin type pigment dispersant, a dyestuff derivative or a surfactant can be used. Since the dispersing aid is superior in dispersing the dyestuffs and has great effect to prevent the re-agglomeration of the dyestuffs after dispersion, a color filter superior in transparency is obtained when the colored composition, in which the dyestuffs are dispersed in the dyestuff carrier using the dispersing aid, is used. The dispersing aid can be used in an amount of, preferably, 0.1 to 40%, more preferably 0.1 to 30%, based on the total weight of the blue and violet pigments.

The resin type pigment dispersant has a portion with an affinity to pigments which portion has a property of adsorbing on the pigments, and a portion compatible with a dyestuff carrier, and functions to stabilize the dispersion of pigments in the dyestuff carrier by being adsorbed on the pigments. The resin type pigment dispersant includes an oily dispersant including a polyurethane, a polycarboxylic acid ester such as a polyacrylate, an unsaturated polyamide, a polycarboxylic acid, a (partial) amine salt of a polycarboxylic acid, an ammonium salt of a polycarboxylic acid, an alkylamine salt of a polycarboxylic acid, a polysiloxane, a long chain polyaminoamide phosphate salt, an ester of hydroxyl group-containing polycarboxylic acid and a modified product thereof, an amide formed by reaction of a poly(lower alkyleneimine) with a polyester having a free carboxyl group, or a salt thereof. Further, a water soluble resin or polymeric compound such as a (meth)acrylic acid-styrene copolymer, a (meth)acrylic acid-(meth)acrylate ester copolymer, a styrene-maleic acid copolymer, a polyvinyl alcohol or a polyvinyl pyrrolidone; a polyester, a modified polyacrylate, an adduct of ethylene oxide/propylene oxide can also be used. These can be used singly or in combination.

The surfactant as the dispersing aid includes anionic surfactants such as sodium lauryl sulfate, polyoxyethylene alkyl ether sulfate, sodium dodecylbenzenesulfonate, an alkali salt of a styrene-acrylic acid copolymer, sodium stearate, sodium alkylnaphthalenesulfonate, sodium alkyldiphenyl ether disulfonate, monoethanolamine lauryl sulfate, triethanolamine lauryl sulfate, ammonium lauryl sulfate, monoethanolamine stearate, sodium stearate, sodium lauryl sulfate and monoethanolamine of a styrene-acrylic acid copolymer, and polyoxyethylene alkyl ether phosphate ester; nonionic surfactants such as polyoxyethylene oleyl ether, polyoxyethylene lauryl ether, polyoxyethylene nonylphenyl ether, poolyoxyethylene alkyl ether phosphate ester, polyoxyethylene sorbitan monostearate and polyethylene glycol monolaurate; cationic surfactants such as a quaternary alkylammonium salt and an ethylene oxide adduct thereof; and amphoteric surfactants such as alkyl betaines such as alkyldimethylaminoacetic acid betaine and alkylimidazolines. These can be used singly or in combination.

The dyestuff derivative is a compound derived from an organic dyestuff by introducing a substituent group therein. The organic dyestuff also includes pale yellow aromatic polycyclic compounds such as naphthalene-based compounds and anthraquinone-based compounds, which are not called as dyestuffs. Examples of dyestuff derivatives include those described in Jpn. Pat. Appln. KOKAI Publication No. 63-305173, Jpn. Pat. Appln. KOKAI Publication No. 57-15620, Jpn. Pat. Appln. KOKAI Publication No. 59-40172, J Jpn. Pat. Appln. KOKAI Publication No. 63-17102 and J Jpn. Pat. Appln. KOKAI Publication No. 5-9469. These dyestuff derivatives may be employed singly or in combination of two or more.

Further, the colored composition of the present invention may contain a storage stabilizer for stabilizing the viscosity of the composition over time, and may contain adhesion-improving agent such as a silane coupling agent. Examples of the storage stabilizer include quaternary ammonium chlorides such as benzyltrimethyl chloride and diethylhydroxyamine, organic acids such as lactic acid and oxalic acid and methyl ether thereof, t-butylpyrocatechol, organic phosphines such as tetraethylphosphine and tetraphenylphosphine, and a salt of phosphorous acid.

Examples of the silane coupling agent include vinyl silanes such as vinyltris(β-methoxyethoxy) silane, vinylethoxy silane and vinyltrimethoxy silane; (meta)acryl silanes such as γ-methacryloxypropyl trimethoxy silane; epoxy silanes such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyltrimethoxy silane and γ-glycidoxypropyltriethoxy silane; aminosilanes such as N-β (aminoethyl)γ-aminopropyltrimethoxy silane, N-β(aminoethyl)γ-aminopropyltriethoxy silane, N-β(aminoethyl)γ-aminopropylmethyldiethoxy silane, γ-aminopropyltriethoxy silane, γ-aminopropyltrimethoxy silane, N-phenyl-γ-aminopropyltrimethoxy silane and N-phenyl-γ-aminopropyltriethoxy silane; and thiosilanes such as γ-mercaptopropyltrimethoxy silane and γ-mercaptopropyltriethoxy silane.

The storage stabilizer can be employed in an amount of 0.1 to 10% by weight based on the weight of the dyestuff, if necessary. Further, the adhesion-improving agent can be employed in an amount of 0.1 to 200% by weight based on the weight of the dyestuff, if necessary.

The colored composition can be formulated in the form of a gravure offset printing ink, a waterless offset printing ink, a silk screen printing ink, or a solvent-developing type or an alkali-developing type colored resist. The colored resist is a composition comprising a thermoplastic resin, a thermosetting resin or a photosensitive resin, together with a monomer, a photopolymerization initiator, and an organic solvent, in which a dyestuff is dispersed.

The dyestuff can be incorporated into the colored composition in an amount of, preferably 5 to 70% by weight, more preferably 20 to 50% by weight, based on total solids of the colored composition.

It is preferable that large grains of 5 μm or more, preferably 1 μm or more and more preferably 0.5 μm or more and mixed dusts are removed by means of, e.g., centrifugal separation, a sintered filter or a membrane filter from the composition of the present invention.

The color filter of the present invention comprises at least one red color filter segment, at least one green color filter segment, and at least one blue color filter segment, each formed on the surface of a transparent substrate by means of printing method or photolithography method, using each colored composition.

As the transparent substrate, it is possible to employ a glass plate such as soda lime glass, low alkali borosilicate glass and alkali-free aluminoborosilicate glass; and a resin plate such as polycarbonate, polymethyl methacrylate and polyethylene terephthalate. Further, in order to actuate the liquid crystal after the fabrication of liquid crystal panel, transparent electrodes made of, e.g., indium oxide or tin oxide may be formed on the surface of the glass or resin plate.

Since in formation of each color filter segment by the printing method, patterning can be performed only by repeating printing and drying a colored composition prepared as the various printing inks, this is low cost and excellent in mass production as a method of preparing a color filter. Further, with development of printing techniques, a fine pattern having a high dimensional precision and smoothness can be printed. In order to perform printing, such the composition is preferable that an ink is not dried and solidified on a printing plate or a blanket. Control of flowability of an ink on a printing machine is also important, and a viscosity of an ink can be adjusted by a dispersant and a loading pigment.

When each color filter segment is formed by the photolithography method, a colored composition prepared as the solvent developing-type or alkali developing-type coloring resist is coated at a dry thickness of 0.2 to 5 μm on a transparent substrate by a coating method such as spray coating, spin coating, slit coating, and roll coating. For drying the coated film, vacuum drying apparatus, a convection oven, IR oven, or a hot plate may be used.

The film which has been dried if necessary is exposed to ultraviolet-ray through a mask having a predetermined pattern which is provided in a state where it is contacted or not contacted with this film. Thereafter, the film is soaked in an alkali developer or a developer is sprayed by spraying, an uncured part is removed to form a desired pattern, and the same procedure is repeated regarding other color. In this way, a color filter can be prepared. Further, in order to promote polymerization of the colored resist, heating can be performed if necessary. By a photolithography method, a color filter can be prepared which has a higher precision than by the printing method.

Upon development, as the alkali developer, an aqueous solution of sodium carbonate or sodium hydroxide is used, and an organic alkali such as dimethylbenzylamine and triethanol amine can be also used. An anti-foaming agent and a surfactant may be added to the developer. For development, shower development method, spray development method, dip development method, or paddle development method may be applied.

In order to increase an ultraviolet-ray exposure sensitivity, after the colored resist is coated and dried, a water-soluble or aqueous alkali solution-soluble resin such as polyvinyl alcohol and a water-soluble acrylic resin is coated and dried to form a film for preventing polymerization inhibition due to oxygen, and thereafter, ultraviolet-ray exposure may be performed.

The color filter of the present invention can be prepared by an electrodeposition method or a transferring method, in place of the aforementioned methods. The electrodeposition method is a method of, by utilizing a transparent electrically conductive film formed on a transparent substrate, preparing a color filter by electrodeposition-forming each color filter pigment on the transparent electrically conductive film by electrophoresis of a colloid particle. The transferring method is a method of forming a color filter layer on a surface of a peelable transfer base sheet in advance, and transferring this color filter layer onto a desired transparent substrate.

Next, a liquid crystal display device provided with a color filter according to the present invention will be described.

Figure 3:
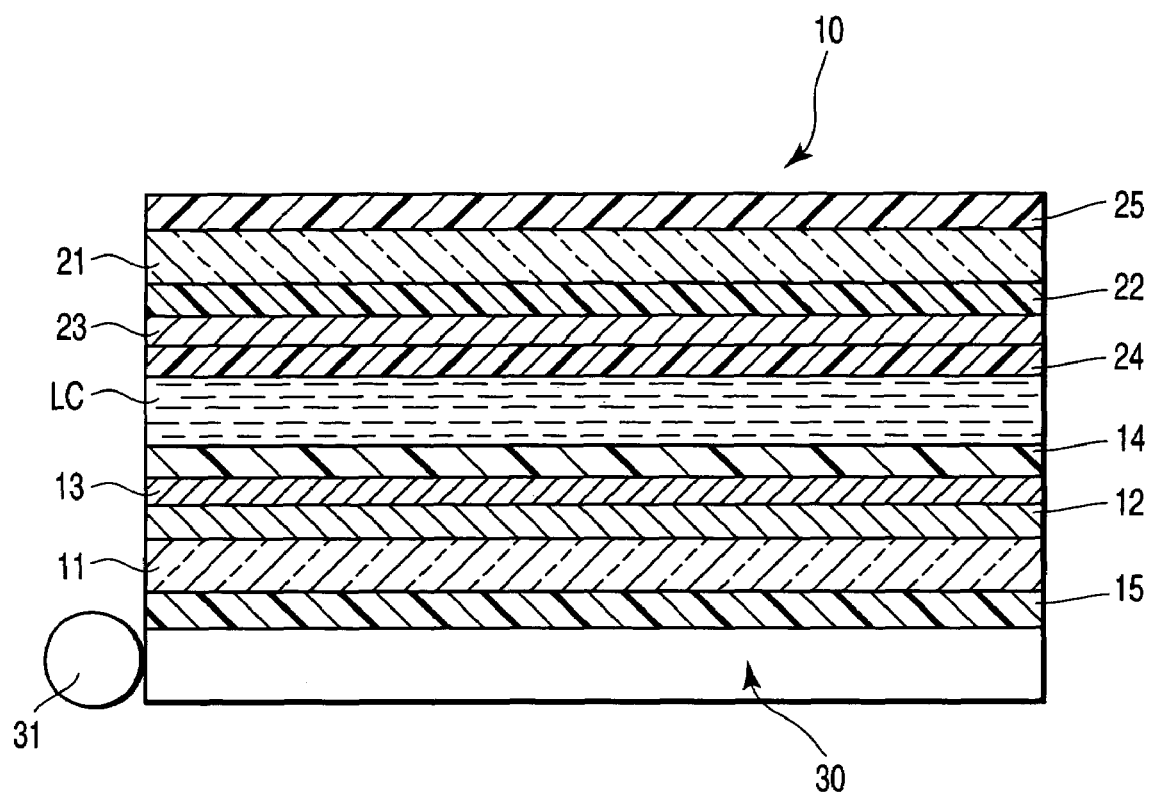
FIG. 3 is a schematic sectional view illustrating one example of a liquid crystal display device provided with a color filter of the present invention.

FIG. 3 is a schematic sectional view illustrating a liquid crystal display device provided with a color filter according to the present invention. The device 10 illustrated in FIG. 3 represents a typical example of a TFT-driven liquid crystal display device for use in a notebook type personal computer. The device 10 comprises a pair of transparent substrates 11 and 21 which are opposedly arranged spaced apart from each other. A liquid crystal LC is sealed between these transparent substrates 11 and 21. The liquid crystal LC will be aligned depending on the type of driving mode such as TN (Twisted Nematic), STN (Super Twisted Nematic), IPS (In-Plane switching), VA (Vertical Alignment), or OCB (Optically Compensated Birefringence) mode.

On the inner surface of the first transparent substrate 11, there is formed a TFT (thin film transistor) array 12, on which a transparent electrode layer 13 made of, e.g., ITO is formed. On the transparent electrode layer 13, an aligning layer 14 is formed. Further, on the outer surface of the transparent substrate 11, a polarizer 15 is provided.

On the other hand, on the inner surface of the second transparent substrate 21, there is formed a color filter 22 according to the present invention. The red, green and blue color filter segments constituting the color filter 22 are respectively separated by a black matrix (not shown). If required, the color filter 22 may be covered by a transparent protective film (not shown), on which a transparent electrode layer 23 made of, e.g., ITO is formed. An aligning layer 24 is provided to cover the transparent electrode layer 23. On the outer surface of the transparent substrate 21, a polarizer 25 is provided. Below the polarizer 15, there is disposed a backlight unit 30 including a three-band lamp 31.

The present invention will be more specifically explained below with reference to Examples; however, the present invention should not be limited to these Examples.

In the following Examples and Comparative Examples, "part(s)" means "part(s) by weight".

<Preparation of Pigments>

The pigments employed in Examples and Comparative Examples are those shown in Table 1 below and blue pigment 2, violet pigments 2-4, red pigments 4 and 5, and yellow pigment 3 prepared as described below. With respect to the blue pigments and violet pigments, the specific surface area was measured according to BET method based on nitrogen adsorption, using an automatic vapor adsorption measuring apparatus ("BELSORP 18", Nippon Bell Co., Ltd.). The results are shown in Table 2 below.

TABLE 1

| Pigment | Symbol | Pigment name | C.I. Pigment No. |
|---|---|---|---|
| Blue pig. 1 | B-1 | "LIONOL BLUE ES" available from TOYO INK MFG. CO., LTD. | C.I. Pigment Blue 15:6 |
| Purple pig. 1 | V-1 | "LIONOGEN VIOLET RL" available from TOYO INK MFG. CO., LTD. | C.I. Pigment Violet 23 |
| Red pig. 1 | R-1 | "IRGAZIN RED 2030" available from Ciba Specialty Chemicals, Inc. | C.I. Pigment Red 254 |
| Red pig. 2 | R-2 | "IRGAPHOR RED B-CF" available from Ciba Specialty Chemicals, Inc. | C.I. Pigment Red 254 |
| Red pig. 3 | R-3 | "CROMOPHTAL RED A2B" available from Ciba Specialty Chemicals, Inc. | C.I. Pigment Red 177 |

TABLE 1-continued

| Pigment | Symbol | Pigment name | C.I. Pigment No. |
|---|---|---|---|
| Green pig. | G | "LIONOL GREEN 6YK" available from TOYO INK MFG. CO., LTD. | C.I. Pigment Green 36 |
| Yellow pig. 1 | Y-1 | "FANCHON FAST YELLOW Y-5688" available from BAYER | C.I. Pigment Yellow 150 |
| Yellow pig. 2 | Y-2 | "PALIOTOL YELLOW K0961HD" available from BAYER | C.I. Pigment Yellow 138 |

TABLE 2

|  | B-1 | B-2 | V-1 | V-2 | V-3 | V-4 |
|---|---|---|---|---|---|---|
| Specific surface area (m²/g) | 79.6 | 98.1 | 85.6 | 96.2 | 106.8 | 126.1 |

<Blue Pigment 2 (B-2)>

200 parts of blue pigment 1 (B-1) shown in Table 1, 1600 parts of sodium chloride, and 100 parts of diethylene glycol (Tokyo Kasei Co., Ltd.) were placed in a 1-gallon stainless steel kneader (Inoue Seisakusho Co., Ltd.) and kneaded for 12 hours at a temperature of 70° C. Then, the resultant mixture was poured into about 5 L of hot water and stirred for about one hour using a high-speed mixer while heating it at a temperature of about 70° C. to give a slurry-like substance. Thereafter, this slurry-like substance was subjected to filtration and water washing to remove sodium chloride and diethylene glycol. The resultant substance was dried for 24 hours at a temperature of 80° C. to afford 198 parts of a salt-milled pigment (blue pigment 2).

<Violet Pigment 2 (V-2)>

200 parts of violet pigment 1 (V-1) shown in Table 1, 1600 parts of sodium chloride, and 100 parts of diethylene glycol (Tokyo Kasei Co., Ltd.) were placed in a 1-gallon stainless steel kneader (Inoue Seisakusho Co., Ltd.) and kneaded for 3 hours at a temperature of 90° C. Then, the resultant mixture was poured into about 5 L of hot water and stirred for about one hour using a high-speed mixer while heating it at a temperature of about 70° C. to give a slurry-like substance. Thereafter, this slurry-like substance was subjected to filtration and water washing to remove sodium chloride and diethylene glycol. The resultant substance was dried for 24 hours at a temperature of 80° C. to afford 198 parts of a salt-milled pigment (violet pigment 2).

<Violet Pigment 3 (V-3)>

300 parts of violet pigment 1 (V-1) shown in Table 1 were poured into 3000 parts of 96% sulfuric acid and stirred for one hour and then poured into cold water at 5° C. and stirred for one hour. Then, the resultant mixture was subjected to filtration, followed by water washing with hot water until wash liquid became neutral. The resultant substance was then dried at a temperature of 70° C. to give an acid pasting treatment pigment. 200 parts of this acid pasting treatment pigment, 1600 parts of sodium chloride, and 100 parts of diethylene glycol (Tokyo Kasei Co., Ltd.) were placed in a 1-gallon stainless steel kneader (Inoue Seisakusho Co., Ltd.) and kneaded for 6 hours at a temperature of 90° C. Then, the resultant mixture was poured into about 5 L of hot water and stirred for about one hour using a high-speed mixer while heating it at a temperature of about 70° C. to give a slurry-like substance. Thereafter, this slurry-like substance was subjected to filtration and water washing to remove sodium chloride and diethylene glycol. The resultant substance was dried for 24 hours at a temperature of 80° C. to afford 198 parts of a salt-milled pigment (violet pigment 3).

<Violet Pigment 4 (V-4)>

Violet pigment 4 was prepared by the same procedures as in the violet pigment 3 except that 10 parts out of 200 parts of the acid pasting treatment pigment was replaced by dispersant A-1 shown below and that the kneading time by means of the kneader was changed to 20 hours.

Dispersant A-1:

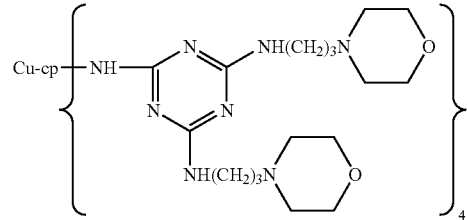

Cu-cp: Copper phthalocyanine residual group

<Red Pigment 4 (R-4)>

160 parts of red pigment 1 (R-1) shown in Table 1, 1600 parts of sodium chloride, and 190 parts of diethylene glycol (Tokyo Kasei Co., Ltd.) were placed in a 1-gallon stainless steel kneader (Inoue Seisakusho Co., Ltd.) and kneaded for 10 hours at a temperature of 60° C. Then, the resultant mixture was poured into about 5 L of hot water and stirred for about one hour using a high-speed mixer while heating it at a temperature of about 70° C. to give a slurry-like substance. Thereafter, this slurry-like substance was subjected to filtration and water washing to remove sodium chloride and diethylene glycol. The resultant substance was dried for 24 hours at a temperature of 80° C. to afford 156 parts of a salt-milled pigment (red pigment 4).

<Red Pigment 5 (R-5)>

152 parts of red pigment 2 (R-2) shown in Table 1, 8 parts of dispersant A-2 shown below, 1600 parts of sodium chloride, and 190 parts of diethylene glycol (Tokyo Kasei Co., Ltd.) were placed in a 1-gallon stainless steel kneader (Inoue Seisakusho Co., Ltd.) and kneaded for 10 hours at a temperature of 60° C. Then, the resultant mixture was poured into about 5 L of hot water and stirred for about one hour using a high-speed mixer while heating it at a temperature of about 70° C. to give a slurry-like substance. Thereafter, this slurry-like substance was subjected to filtration and water washing to remove sodium chloride and diethylene glycol. The resultant substance was dried for 24 hours at a temperature of 80° C. to afford 156 parts of a salt-milled pigment (red pigment 5).

Dispersant A-2:

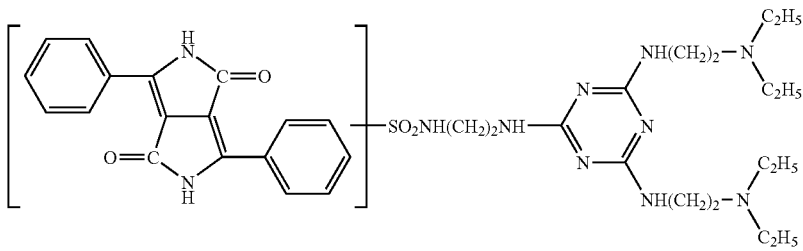

<Yellow Pigment 3 (Y-3)>

200 parts of yellow pigment 2 (Y-2) shown in Table 1, 1500 parts of sodium chloride, and 270 parts of diethylene glycol (Tokyo Kasei Co., Ltd.) were placed in a 1-gallon stainless steel kneader (Inoue Seisakusho Co., Ltd.) and kneaded for 6 hours at a temperature of 60° C. Then, the resultant mixture was poured into about 5 L of hot water and stirred for about one hour using a high-speed mixer while heating it at a temperature of about 70° C. to give a slurry-like substance. Thereafter, this slurry-like substance was subjected to filtration and water washing to remove sodium chloride and diethylene glycol. The resultant substance was dried for 24 hours at a temperature of 80° C. to afford 196 parts of a salt-milled pigment (yellow pigment 3).

<Preparation of Acrylic Resin Solution>

Next, the preparation of an acrylic resin solution employed in Examples and Comparative Examples will be explained. The molecular weight of the resin was a weight average molecular weight in terms of polystyrene, which was measured by GPC (gel permeation chromatography).

800 parts of cyclohexanone was placed in a reaction vessel and heated at a temperature of 100° C. while introducing nitrogen gas into the reaction vessel. While maintaining that temperature, a mixture of the following monomers and a thermal polymerization initiator was added dropwise to the heated cyclohexanone over one hour, thus effecting a polymerization reaction.

| Styrene | 60.0 parts |
|---|---|
| Methacrylic acid | 60.0 parts |
| Methyl methacrylate | 65.0 parts |
| Butyl methacrylate | 65.0 parts |
| Azobisisobutyronitrile | 10.0 parts |

After the addition of the mixture, the reaction was further continued for three hours at a temperature of 100° C. Then, 2.0 parts of azobisisobutyronitrile dissolved in 50 parts of cyclohexanone were added to the reaction mixture and the reaction was further continued for one hour at a temperature of 100° C. to afford a solution of an acrylic resin. The weight average molecular weight of the acrylic resin was about 40000.

After cooled to room temperature, about 2 g of sample of the acrylic resin solution was taken out and heated and dried for 20 minutes at a temperature of 180° C. and non-volatiles were measured. Based on this measurement, cyclohexanone was added to the remaining resin solution in such an amount that the content of the non-volatiles became 20% by weight, affording a desired acrylic resin solution.

<Preparation of Pigment Dispersion>

The mixtures having the compositions (parts) shown in Table 3 were respectively homogeneously stirred and then the resultant mixtures were pulverized for 5 hours by means of sand mill using zirconia beads having a diameter of 1 mm and subjected to filtration using a 5 μm-mesh filter to afford pigment dispersions.

TABLE 3

| | | Pigment dispersion | | | | | | | | | | |
|---|---|---|---|---|---|---|---|---|---|---|---|---|
| | | BP-1 | BP-2 | BP-3 | BP-4 | BP-5 | RP-1 | RP-2 | RP-3 | GP-1 | GP-2 | GP-3 |
| Pigment | First pigment | B-2 | B-1 | B-2 | B-2 | B-2 | R-4 | R-2 | R-5 | G | G | G |
| | Second pigment | — | V-1 | V-2 | V-3 | V-4 | R-3 | R-3 | R-3 | Y-2 | Y-3 | Y-1 |
| Dispersant | | A-1 | A-1 | A-1 | A-1 | A-1 | A-2 | A-2 | A-2 | A-3 | A-3 | A-3 |
| Composition | First pigment | 10.0 | 9.6 | 9.6 | 9.6 | 9.6 | 9.6 | 9.6 | 9.6 | 7.9 | 7.9 | 8.3 |
| | Second pigment | 0.0 | 0.4 | 0.4 | 0.4 | 0.4 | 1.1 | 1.1 | 1.1 | 5.8 | 5.8 | 5.4 |
| | Dispersant | 2.0 | 2.0 | 2.0 | 2.0 | 2.0 | 1.3 | 1.3 | 1.3 | 1.8 | 1.8 | 1.8 |
| | Acrylic resin solution | 40.0 | 40.0 | 40.0 | 40.0 | 40.0 | 40.0 | 40.0 | 40.0 | 36.5 | 36.5 | 36.5 |
| | Organic solvent | 48.0 | 48.0 | 48.0 | 48.0 | 48.0 | 48.0 | 48.0 | 48.0 | 48.0 | 48.0 | 48.0 |
| | Total | 100.0 | 100.0 | 100.0 | 100.0 | 100.0 | 100.0 | 100.0 | 100.0 | 100.0 | 100.0 | 100.0 |

In Table 3, dispersant A-3 is represented by the following formula:

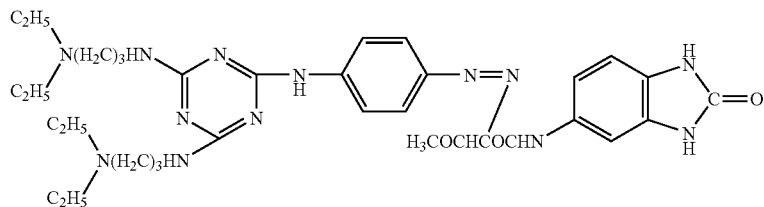

<Preparation of Colored Composition>

The mixtures having the compositions (parts) shown in Table 4 were respectively homogeneously stirred and then the resultant mixtures were subjected to filtration using a 1 μm-mesh filter to respectively afforded a colored composition (hereinafter referred to as a resist).

TABLE 4

|  |  | Resist | | | | | | | | | | |
|---|---|---|---|---|---|---|---|---|---|---|---|---|
|  |  | BR-1 | BR-2 | BR-3 | BR-4 | BR-5 | RR-1 | RR-2 | RR-3 | GR-1 | GR-2 | GR-3 |
|  |  | | | | | Pigment dispersion | | | | | | |
|  |  | BP-1 | BP-2 | BP-3 | BP-4 | BP-5 | RP-1 | RP-2 | RP-3 | GP-1 | GP-2 | GP-3 |
| ComposiTion | Pigment dispersion | 42.0 | 42.0 | 42.0 | 42.0 | 42.0 | 51.0 | 51.0 | 51.0 | 52.0 | 52.0 | 52.0 |
|  | Acrylic resin solution | 10.0 | 10.0 | 10.0 | 10.0 | 10.0 | 1.0 | 1.0 | 1.0 | 0.0 | 0.0 | 0.0 |
|  | Monomer | 5.6 | 5.6 | 5.6 | 5.6 | 5.6 | 4.0 | 4.0 | 4.0 | 4.8 | 4.8 | 4.8 |
|  | Photopoly-merizaion initiator | 2.0 | 2.0 | 2.0 | 2.0 | 2.0 | 3.4 | 3.4 | 3.4 | 2.8 | 2.8 | 2.8 |
|  | Sensitizer | 0.2 | 0.2 | 0.2 | 0.2 | 0.2 | 0.4 | 0.4 | 0.4 | 0.2 | 0.2 | 0.2 |
|  | Organic solvent | 40.2 | 40.2 | 40.2 | 40.2 | 40.2 | 40.2 | 40.2 | 40.2 | 40.2 | 40.2 | 40.2 |
|  | Total | 100.0 | 100.0 | 100.0 | 100.0 | 100.0 | 100.0 | 100.0 | 100.0 | 100.0 | 100.0 | 100.0 |

In Table 4;

Monomer: Trimethylolpropane triacrylate ("NK Ester ATMPT"; Shin Nakamura Kagaku Co., Ltd.)

Photopolymerization initiator: 2-methyl-1-[4-(methylthio)phenyl]-2-morpholinopropan-1-one ("Irgacure 907"; Chiba Speciality Chemicals Co., Ltd.)

Sensitizer: 4,4'-bis(diethylamino)benzophenone ("EAB-F"; Hodogaya Kagaku Co., Ltd.)

Organic solvent: Cyclohexanone

EXAMPLES 1-9 AND COMPARATIVE EXAMPLES 1-4

Using color resists shown in Table 5, color filters were prepared according to the following method.

TABLE 5

|  | Resist | | | Contrast ratio of single color filter segment | | | | | | Blue filter segment chromaticity |
|---|---|---|---|---|---|---|---|---|---|---|
|  | Red | Green | Blue | CR | CG | CB | CB/CG | CR/CG | CB/CR | coordinate, y |
| Ex. 1 | RR-1 | GR-1 | BR-1 | 1216 | 1504 | 5403 | 3.59 | 0.81 | 4.44 | 0.135 |
| Ex. 2 | RR-1 | GR-1 | BR-3 | 1216 | 1504 | 3578 | 2.38 | 0.81 | 2.94 | 0.105 |
| Ex. 3 | RR-1 | GR-1 | BR-4 | 1216 | 1504 | 4750 | 3.16 | 0.81 | 3.91 | 0.105 |
| Ex. 4 | RR-2 | GR-2 | BR-5 | 2397 | 2829 | 5318 | 1.88 | 0.85 | 2.22 | 0.107 |
| Ex. 5 | RR-3 | GR-2 | BR-5 | 2877 | 2829 | 5318 | 1.88 | 1.02 | 1.85 | 0.105 |
| Ex. 6 | RR-2 | GR-2 | BR-3 | 2397 | 2829 | 3578 | 1.26 | 0.85 | 1.49 | 0.107 |
| Ex. 7 | RR-1 | GR-2 | BR-5 | 1216 | 2829 | 5318 | 1.88 | 0.43 | 4.37 | 0.107 |
| Ex. 8 | RR-3 | GR-2 | BR-3 | 2877 | 2829 | 3578 | 1.26 | 1.02 | 1.24 | 0.106 |
| Ex. 9 | RR-3 | GR-1 | BR-4 | 2877 | 1504 | 4750 | 3.16 | 1.91 | 1.65 | 0.106 |
| Comp. Ex. 1 | RR-1 | GR-3 | BR-4 | 1216 | 6450 | 4750 | 0.74 | 0.19 | 3.91 | 0.106 |
| Comp. Ex. 2 | RR-3 | GR-2 | BR-2 | 2877 | 2829 | 2290 | 0.81 | 1.02 | 0.80 | 0.107 |
| Comp. Ex. 3 | RR-1 | GR-2 | BR-2 | 1216 | 2829 | 2290 | 0.81 | 0.43 | 1.88 | 0.106 |
| Comp. Ex. 4 | RR-2 | GR-3 | BR-2 | 2397 | 6450 | 2290 | 0.35 | 0.37 | 0.96 | 0.106 |

<Preparation of Color Filters>

First, by means of spin-coating method, a red resist was coated on the surface of a glass substrate having a black matrix formed thereon in advance, and pre-baked for 20 minutes in a clean oven at a temperature of 70° C. Thereafter, the substrate was cooled down to room temperature and then exposed through a photomask to ultra-violet rays using an ultra-high pressure mercury lamp. Subsequently, by using an aqueous sodium carbonate solution at 23° C., the resultant substrate was subjected to spray development and then washed with ion-exchange water and air-dried. Further, the resultant substrate was placed in a clean oven and subjected to post-baking at a temperature of 230° C. for 30 minutes to form stripe-shaped red filter segments on the surface of the substrate.

Then, by using a green resist, green filter segments were formed in the same manner as described above. Likewise, by using a blue resist, blue filter segments were formed in the same manner as described above, thus forming a color filter. The film thickness of each of the color filter segments was 2.0 μm.

<Preparation of Dry Coat Film for Measuring the Contrast Ratio of Each Color Filter Segment>

By means of spin-coating method, each of the color resists was coated on the surface of a glass substrate and pre-baked for 20 minutes in a clean oven at a temperature of 70° C. Thereafter, the substrate was cooled down to room temperature and then exposed to ultra-violet rays using an ultra-high pressure mercury lamp. Subsequently, by making use of an aqueous sodium carbonate solution at 23° C., the resultant substrate was subjected to spray development and then washed with ion-exchange water and air-dried. Subsequently, the resultant substrate was placed in a clean oven and subjected to post-baking at a temperature of 230° C. for 30 minutes to form a dry coat film for measuring the contrast ratio of each color filter segment on the surface of the substrate. The film thickness of each dry coat films was 2.0 μm.

<Fabrication of Liquid Crystal Display Devices>

A transparent ITO electrode layer was formed on the surface of the color filter prepared as described above and a polyimide alignment layer was formed on the ITO electrode layer. On the opposite surface of this glass substrate, a polarizer was provided. On the other hand, a TFT array and pixel electrodes were formed on one surface of another (a second) glass substrate and a polarizer was formed on the other surface of the second glass substrate.

The glass substrates thus prepared were opposedly arranged such that the electrode layers face each other while securing a space between these glass substrates by using spacer beads, thereby aligning these glass substrates with each other. Then, the peripheral portion of the resultant assembly was entirely sealed with a sealant excluding an opening for introducing a liquid crystal composition. Then, a liquid crystal composition was introduced through the opening into the assembly and then the opening was sealed. The liquid crystal display device thus fabricated was integrated with a backlight unit, providing a liquid crystal panel.

The color filters obtained in Examples and Comparative Examples were evaluated as follows.

<Measurement of Chromaticity of Blue Filter Segment>

By using a microspectrophotometer (OSP-SP200; Olympus Kogaku Industries Ltd.), the chromaticity coordinate, y, of the blue color filter segment was measured using C-light source, with a 2 degree field of view. The results are shown in Table 5 below.

<Measurement of Chromaticity of Parallel-transmitted Light and Orthogonal-transmitted Light of Color Filter>

Figures 4A, 4B:
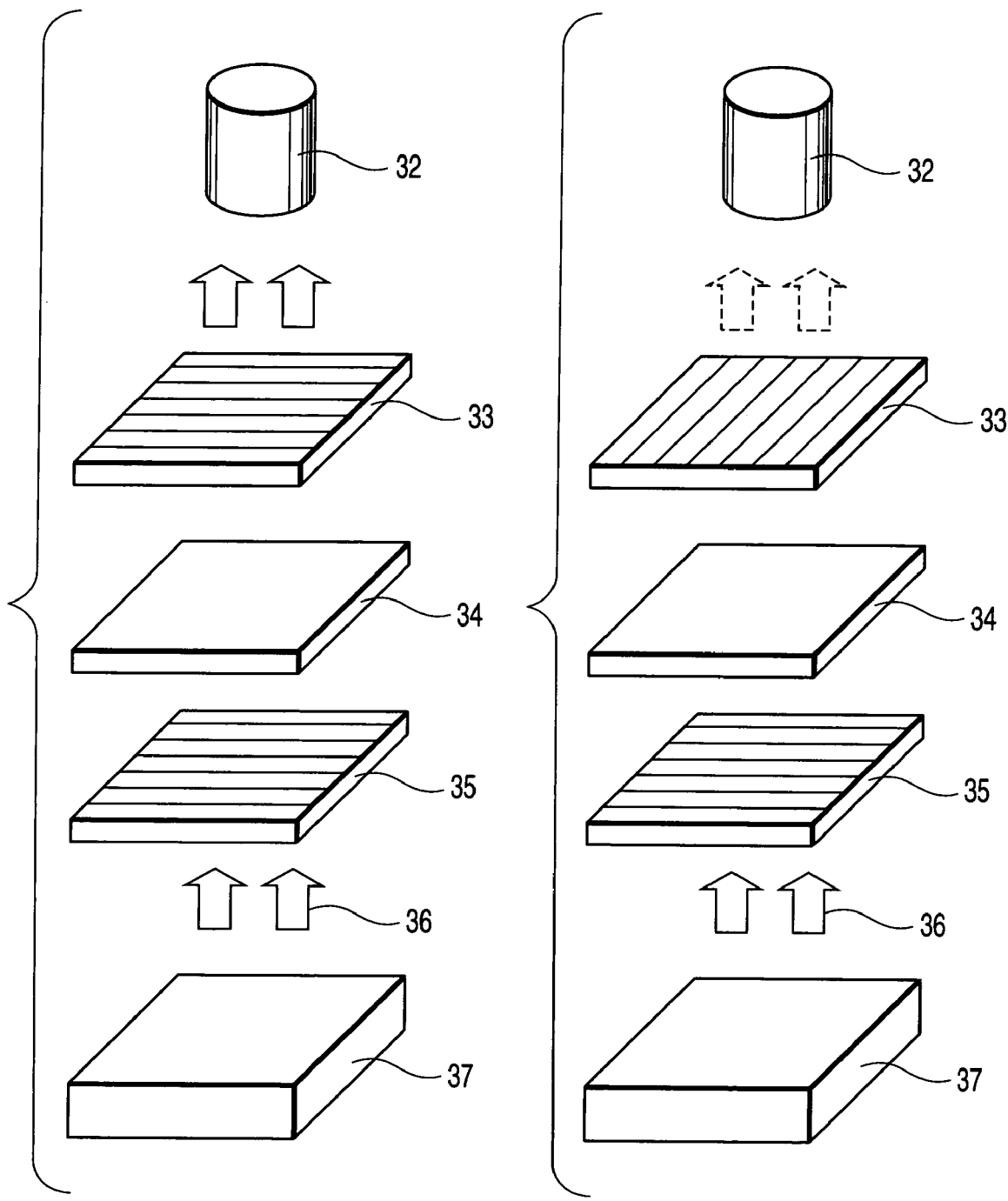
FIGS. 4A and 4B respectively show an exploded perspective view of a color filter for explaining a method of measuring the contrast ratio thereof.

First, as shown in FIG. 4A, a pair of polarizers 33 and 35 were superimposed to both sides of the color filter 34, respectively, with the axes of polarization of the polarizers 33 and 35 being made parallel with each other. A backlight 37 was applied from the polarizer 35 side to measure the chromaticity coordinates of the light transmitted through the polarizer 33 (chromaticity of parallel-transmitted light). This measurement of chromaticity was performed using a luminance calorimeter (BM-5A; Topcon Co., Ltd.) 32, with a 2 degree field of view (CIE 1931 color specification system).

Then, as shown in FIG. 4B, with the axes of polarization of polarizers 33 and 35 being orthogonally intersected with each other, a backlight 37 was applied from the polarizer 35 side to measure the chromaticity coordinates of the light transmitted through the polarizer 33 (chromaticity of orthogonal-transmitted light) by using of the luminance calorimeter 32.

As the backlight, there was employed one which exhibits an emission spectrum as shown in FIG. 1, a luminance of 1937 cd/m$^2$, chromaticity coordinates (x, y) of (0.316, 0.301) in the chromaticity diagram of the XYZ color specification system, a color temperature of 6525K, and a chromaticity deviation, duv, of −0.0136. Further, as the polarizers, NPF-SEG 1224 DU (Nitto Denko Co., Ltd.) was employed.

Figure 5:
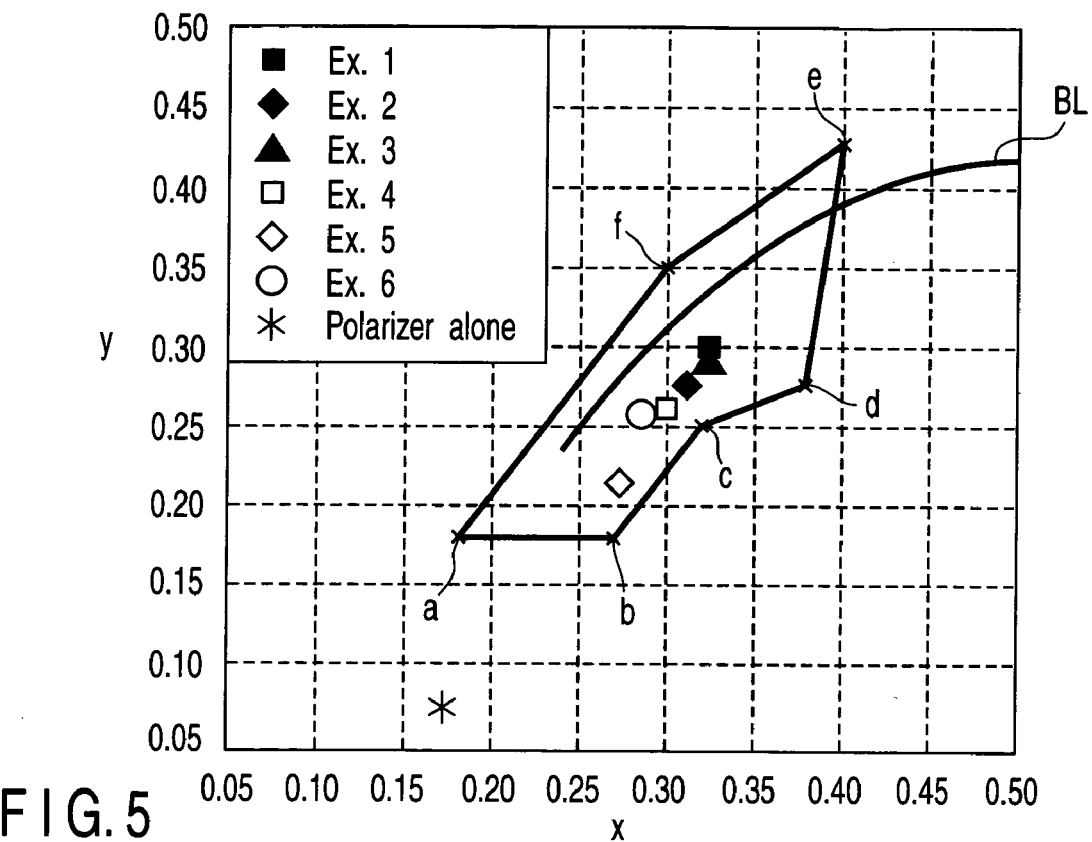
FIG. 5 is a graph showing a chromaticity of orthogonal-transmitted light in each of the color filters of Examples 1-6 to be described in detail hereinafter.
Figure 6:
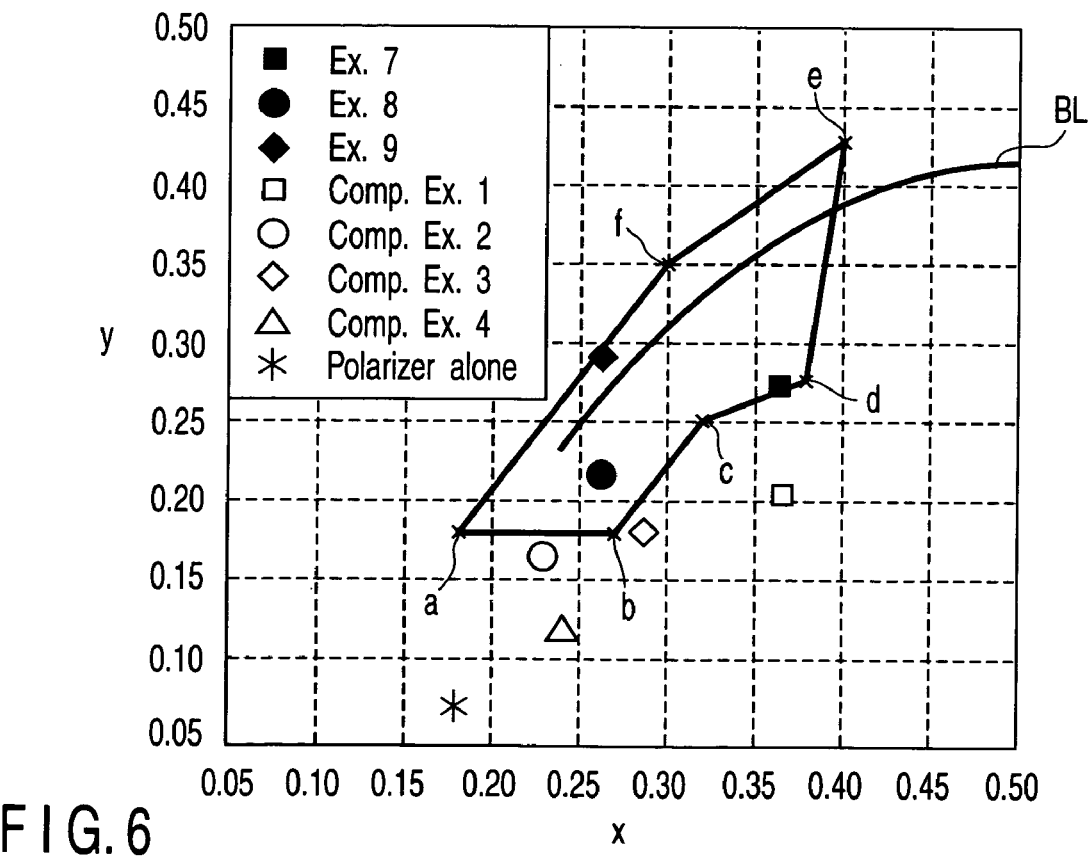
FIG. 6 is a graph showing a chromaticity of orthogonal-transmitted light in each of the color filters of Examples 7-9 and Comparative Examples 1-4 to be described in detail hereinafter.

Further, based on the above formula (1), Δxy was calculated from the chromaticity ($x_p$, $y_p$) of parallel-transmitted light and the chromaticity ($x_c$, $y_c$) of orthogonal-transmitted light. The results are shown in Table 6 and the chromaticity ($x_c$, $y_c$) of orthogonal-transmitted light is shown in FIGS. 5 and 6.

TABLE 6

| | Chromaticity and luminance of parallel-transmitted light | | | Chromaticity and luminance of orthogonal-transmitted light | | | | Contrast ratio of color filter | Tinting state of liquid crystal panel at black displaying |
|---|---|---|---|---|---|---|---|---|---|
| | $x_p$ | $y_p$ | $L_p$ (cd/m$^2$) | $x_c$ | $y_c$ | $L_c$ (cd/m$^2$) | Δxy | | |
| Ex. 1 | 0.308 | 0.326 | 219.4 | 0.325 | 0.305 | 0.1683 | 0.027 | 1564 | ○ |
| Ex. 2 | 0.318 | 0.322 | 205.3 | 0.313 | 0.281 | 0.1670 | 0.041 | 1475 | ○ |
| Ex. 3 | 0.320 | 0.325 | 205.2 | 0.323 | 0.297 | 0.1656 | 0.027 | 1487 | ○ |
| Ex. 4 | 0.321 | 0.325 | 204.8 | 0.300 | 0.266 | 0.0880 | 0.062 | 2792 | ○ |
| Ex. 5 | 0.321 | 0.325 | 205.0 | 0.286 | 0.263 | 0.0834 | 0.070 | 2949 | ○ |
| Ex. 6 | 0.319 | 0.321 | 204.8 | 0.274 | 0.221 | 0.0897 | 0.109 | 2738 | Δ (slightly violet) |
| Ex. 7 | 0.319 | 0.325 | 204.0 | 0.362 | 0.276 | 0.1144 | 0.065 | 2139 | Δ (slightly red) |
| Ex. 8 | 0.319 | 0.321 | 204.9 | 0.259 | 0.215 | 0.0709 | 0.122 | 2888 | Δ (slightly blue) |
| Ex. 9 | 0.321 | 0.325 | 206.2 | 0.263 | 0.294 | 0.1346 | 0.066 | 1838 | Δ (slightly blue green) |
| Comp. Ex. 1 | 0.314 | 0.329 | 203.8 | 0.364 | 0.205 | 0.0831 | 0.134 | 2942 | X (red) |
| Comp. Ex. 2 | 0.318 | 0.318 | 204.9 | 0.230 | 0.161 | 0.0881 | 0.181 | 2791 | X (blue) |

TABLE 6-continued

| | Chromaticity and luminance of parallel-transmitted light | | | Chromaticity and luminance of orthogonal-transmitted light | | | | Contrast ratio of color filter | Tinting state of liquid crystal panel at black displaying |
|---|---|---|---|---|---|---|---|---|---|
| | $x_p$ | $y_p$ | $L_p$ (cd/m$^2$) | $x_c$ | $y_c$ | $L_c$ (cd/m$^2$) | $\Delta xy$ | | |
| Comp. Ex. 3 | 0.316 | 0.318 | 203.9 | 0.287 | 0.184 | 0.1191 | 0.137 | 2054 | X (violet) |
| Comp. Ex. 4 | 0.318 | 0.318 | 204.8 | 0.240 | 0.122 | 0.0610 | 0.211 | 4026 | X (blue violet) |
| Polarizer alone* | 0.311 | 0.314 | 800.0 | 0.176 | 0.076 | 0.0538 | 0.274 | 14876 | — |

Also, the measurements of the chromaticity ($x_p$, $y_p$) of parallel-transmitted light and the chromaticity ($x_c$, $y_c$) of orthogonal-transmitted light in the case where the polarizer alone was employed (without the color filter) were performed in the same manner as described above, with the color filter 34 being removed from the structures shown in FIGS. 4A and 4B. Then, the $\Delta xy$ was calculated based on the formula (1). The results are also shown in Table 6, and the chromaticity ($x_c$, $y_c$) of orthogonal-transmitted light is also shown in FIGS. 5 and 6.

<Measurement of Contrast Ratio of Each Color Filter Segment and Color Filter>

In the same manner as in the measurement of the chromaticity of parallel-transmitted light and orthogonal-transmitted light of the color filter, a pair of polarizers 33 and 35 were superimposed to both sides of each color filter segment and the color filter 34, as shown in FIG. 4A. Then, with the axes of polarization of the polarizers 33 and 35 being made parallel to each other, a backlight 37 was applied from the polarizer 35 side to measure the luminance $L_p$ of the light transmitted through the polarizer 33 (luminance of parallel-transmitted light) by using the luminance colorimeter 32.

Then, as shown in FIG. 4B, with the axes of polarization of polarizers 33 and 35 being orthogonally intersected with each other, a backlight 37 was applied from the polarizer 35 side to measure the luminance $L_c$ of the light transmitted through the polarizer 33 (luminance of orthogonal-transmitted light) by using a luminance calorimeter 32.

Further, the luminance $L_p$ of parallel-transmitted light and the luminance $L_c$ of orthogonal-transmitted light of the polarizers alone were similarly measured with the color filter 34 removed from the structures shown in FIGS. 4A and 4B.

By using the values thus measured, the contrast ratio ($L_p/L_c$) was calculated. The results are shown also in Tables 5 and 6.

<State of Tinting at the Black Image-displaying Time of Liquid Crystal Panel>

A black image was displayed on a liquid crystal display device fabricated above, and the state of tinting was visually observed. The ranking of evaluation was as follows, and the results are shown also in Table 6.

In Table 6:

○: Tinting was not observed at all and the visibility was excellent.

Δ: Tinting was slightly observed, but was at a level of practically no problem.

X: Remarkably large extent of tinting was observed, and the visibility was inferior.

As shown in Table 6, and FIGS. 5 and 6, the magnitude of change, $\Delta xy$, of chromaticity of parallel-transmitted light and orthogonal-transmitted light of the polarizer alone was 0.274 and the chromaticity of orthogonal-transmitted light was also considerably shifted toward the blue color. On the other hand, in the case of the color filters of Examples 1-9, $\Delta xy$ was suppressed to less than 0.130. As a result, the tinting was low at the black image-displaying time of the liquid crystal panel and the visibility was excellent. In particular, in the case of the color filters of Examples 1-5 all satisfying the relationships of the formulas (2), (3) and (4), the tinting was not substantially observed at the black image-displaying time and the visibility was very excellent.

On the other hand, in the case of the color filters of Comparative Examples 1-4, $\Delta xy$ was not less than 0.130 and the magnitude of tinting at the black image-displaying time of the liquid crystal panel was considerably large, thus indicating inferior visibility. Further, in the case of the color filters of Comparative Examples 1-4, as shown in FIG. 6, the chromaticity ($x_c$, $y_c$) of orthogonal-transmitted light was considerably deviated from the region on the xy plane of chromaticity diagram of XYZ color specification system, which region is defined by a first straight line connecting a chromaticity a (0.180, 0.180) with a chromaticity b (0.270, 0.180), a second straight line connecting the chromaticity b with a chromaticity c (0.320, 0.250), a third straight line connecting the chromaticity c with a chromaticity d (0.380, 0.280), a fourth straight line connecting the chromaticity d with a chromaticity e (0.400, 0.430), a fifth straight line connecting the chromaticity e with a chromaticity f (0.300, 0.350), and a sixth straight line connecting the chromaticity f and the chromaticity a.

In the case of the color filters of Examples 1 and 3 where the values of CB/CG and CB/CR were increased as compared with Example 2, it was possible to minimize the value of $\Delta xy$.

Further, in the case of the color filters of Examples 4 and 5 where the contrast ratio of the red, green and blue color filter segments was increased as compared with Examples 2 and 3, it was possible to greatly enhance the contrast ratio of the color filter.

As described above, according to the color filter of the present invention, since the difference in chromaticity of the parallel-transmitted light and orthogonal-transmitted light can be minimized when it is measured with the color filter being sandwiched between a pair of polarizers, it is now possible, through the employment of the color filter of the present invention for the manufacture of liquid crystal display devices, to obtain a liquid crystal display device of high quality which is excellent in color reproducibility in the display of white image and black image and hence excellent in visibility.

What is claimed is:

1. A color filter comprising red, green and blue color filter segments, wherein when chromaticity coordinates (x, y) in a chromaticity diagram of XYZ color specification system are measured with the color filter being sandwiched between two polarizers, a chromaticity ($x_p$, $y_p$) of parallel-transmitted light and a chromaticity $(x_p, y_c)$ of orthogonal-transmitted light satisfy the following formula (1):

$$\Delta xy[(x_p-x_c)^2+(y_p-y_c)^2]^{1/2}<0.130 \quad (1),$$

wherein the chromaticity $(x_c, y_c)$ of the orthogonal—transmitted light is within a region on a xy plane of a chromaticity diagram of XYZ color specification system, which region is defined by a first straight line connecting a chromaticity a (0.180, 0.180) with a chromaticity b (0.270, 0.180), a second straight line connecting the chromaticity b with a chromaticity c (0.320, 0.250), a third straight line connecting the chromaticity c with a chromaticity d (0.380, 0.280), a fourth straight line connecting the chromaticity d with a chromaticity e (0.400, 0.430), a fifth straight line connecting the chromaticity e with a chromaticity f (0.300, 0.350), and a sixth straight line connecting the chromaticity f and the chromaticity a.

2. The color filter according to claim 1, wherein a contrast ratio of the color is 1400 or more, but 15000 or less.

3. The color filter according to claim 1, wherein the blue color filter segment is formed from a blue colored composition comprising a dyestuff carrier consisting of a transparent resin, a precursor thereof or a mixture thereof, and C.I. Pigment Blue 15:6 pigment having a specific surface area of not less than 90 m²/g, but not more than 140 m²/g, as measured according to the Brunauer-Emett-Teller method.

4. The color filter according to claim 3, wherein the blue colored composition further contains C.I. Pigment Violet 23 pigment having a specific surface area of not less than 90 m²/g, but not more than 150 m²/g, as measured according to the Brunauer-Emett-Teller method.

5. A liquid crystal display device provided with a color filter according to claim 1.

6. The color filter according to claim 1, wherein contrast ratios of the red, green and blue color filter segments satisfy the following formulas (2), (3) and (4):

$$CB/CG \geq 1.30 \quad (2)$$

$$1.80 \geq CR/CG \geq 0.50 \quad (3)$$

$$CB/CR \geq 1.30 \quad (4)$$

where CR is a contrast ratio of the red filter segment; CG is a contrast ratio of the green filter segment; and CB is a contrast ratio of the blue filter segment.

7. The color filter according to claim 1, wherein a chromaticity coordinate, y, of the blue color filter segment in the chromaticity diagram of the XYZ color specification system is less than 0.140 and the contrast ratio of the blue color filter segment is not less than 2000, but not more than 15000.

8. A color filter comprising red, green and blue color filter segments, wherein when chromaticity coordinates (x, y) in a chromaticity diagram of XYZ color specification system are measured with the color filter being sandwiched between two polarizers, a chromaticity $(X_p, y_p)$ of parallel-transmitted light and a chroniaticity $(x_p, y_c)$ of orthogonal-transmitted light satisfy the following formula (1):

$$\Delta xy[(x_p-x_c)^2+(y_p-y_c)^2]^{1/2}<0.130 \quad (1),$$

wherein contrast ratios of the red, green and blue color filter segments satisfy the following formulas (2), (3) and (4):

$$CB/CG \geq 1.30 \quad (2)$$

$$1.80 \geq CR/CG \geq 0.50 \quad (3)$$

$$CB/CR \geq 1.30 \quad (4)$$

where CR is a contrast ratio of the red filter segment; CG is a contrast ratio of the green filter segment; and CB is a contrast ratio of the blue filter segment.

9. The color filter according to claim 8, wherein a contrast ratio of the color is 1400 or more, but 15000 or less.

10. The color filter according to claim 8, wherein a chromaticity coordinate, y, of the blue color filter segment in the chromaticity diagram of the XYZ color specification system is less than 0.140 and the contrast ratio of the blue color filter segment is not less than 2000, but not more than 15000.

11. The color filter according to claim 8, wherein the blue color filter segment is formed from a blue colored composition comprising a dyestuff carrier consisting of a transparent resin, a precursor thereof or a mixture thereof, and C.I. Pigment Blue 15:6 pigment having a specific surface area of not less than 90 m²/g, but not more than 140 m²/g, as measured according to the Brunauer-Emett-Teller method.

12. The color filter according to claim 11, wherein the blue colored composition further contains C.I. Pigment Violet 23 pigment having a specific surface area of not less than 90 m²/g, but not more than 150 m²/g, as measured according to the Brunauer-Emett-Teller method.

13. A liquid crystal display device provided with a color filter according to claim 8.

14. A color filter comprising red, green and blue color filter segments, wherein when chromaticity coordinates (x, y) in a chromaticity diagram of XYZ color specification system are measured with the color filter being sandwiched between two polarizers, a chromaticity $(x_p, y_p)$ of parallel-transmitted light and a chromaticity $(x_p, y_c)$ of orthogonal-transmitted light satisfy the following formula (1):

$$\Delta xy[(x_p-x_c)^2+(y_p-y_c)^2]^{1/2}<0.130 \quad (1),$$

wherein a chromaticity coordinate, y, of the blue color filter segment in the chromaticity diagram of the XYZ color specification system is less than 0.140 and the contrast ratio of the blue color filter segment is not less than 2000, but not more than 15000.

15. The color filter according to claim 14, wherein a contrast ratio of the color is 1400 or more, but 15000 or less.

16. The color filter according to claim 14, wherein the blue color filter segment is formed from a blue colored composition comprising a dyestuff carrier consisting of a transparent resin, a precursor thereof or a mixture thereof, and C.I. Pigment Blue 15:6 pigment having a specific surface area of not less than 90 m²/g, but not more than 140 m²/g, as measured according to the Brunauer-Emett-Teller method.

17. The color filter according to claim 16, wherein the blue colored composition further contains C.I. Pigment Violet 23 pigment having a specific surface area of not less than 90 m²/g, but not more than 150 m²/g, as measured according to the Brunauer-Emett-Teller method.

18. A liquid crystal display device provided with a color filter according to claim 14.

* * * * *

UNITED STATES PATENT AND TRADEMARK OFFICE
CERTIFICATE OF CORRECTION

PATENT NO. : 7,420,632 B2  
APPLICATION NO. : 11/094226  
DATED : September 2, 2008  
INVENTOR(S) : Tanaka et al.

Page 1 of 1

It is certified that error appears in the above-identified patent and that said Letters Patent is hereby corrected as shown below:

Column 25, line 3 (claim 1), add an equal sign (=) after "$\Delta xy$" in the formula, as follows:

$$\Delta xy = [(x_p - x_c)^2 + (y_p - y_c)^2]^{1/2} < 0.130 \qquad (1)$$

Column 25, line 57 (claim 8), add an equal sign (=) after "$\Delta xy$" in the formula, as follows:

$$\Delta xy = [(x_p - x_c)^2 + (y_p - y_c)^2]^{1/2} < 0.130 \qquad (1)$$

Column 26, line 37 (claim 14), add an equal sign (=) after "$\Delta xy$" in the formula, as follows:

$$\Delta xy = [(x_p - x_c)^2 + (y_p - y_c)^2]^{1/2} < 0.130 \qquad (1)$$

Signed and Sealed this

Twenty-seventh Day of January, 2009

JOHN DOLL  
*Acting Director of the United States Patent and Trademark Office*